United States Patent
Johnson

[15] 3,674,008
[45] July 4, 1972

[54] QUANTITATIVE PULSED TRANSILLUMINATOR AND METHOD OF OPERATION

[72] Inventor: Curtis C. Johnson, Lynnwood, Wash.

[73] Assignee: The Battelle Development Corporation, Columbus, Ohio

[22] Filed: July 13, 1970

[21] Appl. No.: 54,285

[52] U.S. Cl. .................................128/2 A, 128/23, 356/201
[51] Int. Cl. ...........................................................A61b 5/00
[58] Field of Search................128/2 A, 2 L, 2 R, 2 V, 2.05 P, 128/23; 356/201–203

[56] References Cited

UNITED STATES PATENTS

| | | | |
|---|---|---|---|
| 2,640,389 | 6/1953 | Liston | 128/2 L |
| 3,139,086 | 6/1964 | Botsch et al. | 128/2.05 P |
| 3,480,786 | 11/1969 | Kottman | 356/203 |
| 3,086,390 | 4/1963 | Brown | 128/2 V |
| 2,760,485 | 8/1956 | Adelman | 128/2 A |
| 2,641,158 | 6/1953 | Sweet | 356/203 |
| 2,776,377 | 1/1957 | Anger | 128/2 A |
| 3,152,587 | 10/1964 | Ullrich et al. | 128/2 L |

Primary Examiner—William E. Kamm
Attorney—Christensen, Sanborn & Matthews

[57] ABSTRACT

An instrument is described which quantitatively measures optical density of the transilluminated body portion. The instrument comprises a controllable, relatively low-frequency oscillator generating pulses which are applied to a light source through a first expand and delay circuit. A light-conducting means, such as a fiber optic device, optically couples the light source to one side of the body portion and a similar means optically couples another side of the body portion to a light detector. Alternatively, the light source and detector may be placed directly on the body portion. After compensation for ambient light, the output of the detector is coupled to a sample and hold circuit which is triggered by the controllable oscillator through a second expand and delay circuit. The stored signal in the sample and hold circuit is proportional to transmittance and is converted to a visual indication of optical density by a calibrated display means. Methods of using the instrument in diagnosis are discussed, as are further applications to spectrophotometric determinations.

18 Claims, 5 Drawing Figures

INVENTOR.
CURTIS C. JOHNSON
BY
Christensen Sanborn & Matthews
ATTORNEYS

INVENTOR.
CURTIS C. JOHNSON

QUANTITATIVE PULSED TRANSILLUMINATOR AND METHOD OF OPERATION

BACKGROUND OF THE INVENTION

This invention relates to apparatus for transilluminating body portions in diagnosis, and, more particularly, to such an apparatus providing a quantitative determination of the optical density of a transilluminated body portion.

The invention described herein was made in the course of work under a grant from the Department of Health, Education and Welfare.

It has long been known that by observation of the amount of light transmission through a human or animal body, or transillumination, a physician or a trained observer can learn much about the internal structure of that body. For example, transillumination in medical applications has been used for examining sinus cavities, the scrotum, and fluid cavities in the head and abdomen. Transillumination is of particular importance in detecting and diagnosing the onset of hydrocephalus, which involves an abnormal increase in the amount of cerebrospinal fluid within the cranial cavity. This condition is particularly common in premature infants and includes expansion of the cerebral ventricles, sometimes accompanied by enlargement of the skull, especially the forehead, and resultant atrophy of the brain. Because of the very real possibility of mental retardation accompanying hydrocephalus, it is most desirable to detect this condition as soon as possible so that appropriate corrective measures may be taken.

Previously, transillumination used in diagnosing hydrocephalus has been of the "clinical" type in which a physician or other trained observer places an infant in a darkened room, then remains in that room for approximately ten minutes so that the observer's eyes become accustomed to the low level of light therein. A flashlight or other light-producing device is then placed adjacent the infant's skull and the remainder of the skull is examined from light transmission from the light source. If the skull is normal and the fluid within the cranial cavity is at a normal level, the skull will be relatively opaque so that very little light is transmitted therethrough. On the other hand, if there is a relatively large quantity of fluid in the immediate vicinity of a light source, the skull will be relatively translucent so that transmitted light can be seen by the observer. By trial and error methods, the observer can ascertain the location of the fluid-filled area.

However, clinical transillumination poses many problems. The procedure is time consuming. Further, subjective visual impressions of transillumination are highly variable from observer to observer, as well as by one observer from day to day. Most important, clinical transillumination does not provide sufficient sensitivity to detect hydrocephalus at its very onset. For example, when examining the skull of a normal infant, transillumination using a flashlight reveals transmitted light only within a radius of about 1 to 2 centimeters of the light source. This limited range of sensitivity makes it most difficult to detect hydrocephalous conditions in remote areas of the skull.

The prior art has attempted to provide increased sensitivity in devices useful in clinical transillumination. In some cases, the design of the light source of flashlight has been changed to increase its flexibility and usable intensity. In another case, where it is desired to photograph internal organs by means of transillumination, and not necessarily those associated with hydrocephalus, a pulsed light source is placed on one side of the body portion and the transmitted light is viewed by a photographic detector whose shutter is actuated at about the time of the pulse to the light source. In this manner, the subjective variable due to human reading at the time of transillumination is partially eliminated. However, even this apparatus is subject to errors in subjective interpretation of the resultant photograph.

All the prior devices require a darkened room for their use. In addition, none of these prior devices gives a quantitative measure of the degree of transillumination, which measure does not depend on the subjective variables of human detection and interpretation.

It is therefore an object of this invention to provide a transilluminator that allows early detection of hydrocephalus and other diseases or abnormalities involving an increase of body fluid.

It is a further object of this invention to provide a transilluminator that gives accurate, readily reproducible, and quantitative measurements of light transmittance through a human or animal body.

SUMMARY OF THE INVENTION

These objects and others are achieved according to one embodiment of the invention by means providing a high-intensity light pulse and conducting said pulse to one point on the body portion to be transilluminated, means providing a signal proportional to the light detected at a second point on the body portion, and means sampling said signal to remove ambient and noise components and furnishing therefrom an output indication of the optical density of said body portion.

BRIEF DESCRIPTION OF THE DRAWINGS

For a complete understanding of the invention, together with further objects and advantages thereof, reference should be made to the following portion of the specification taken in conjunction with the accompanying drawings in which.

DESCRIPTION OF A PREFERRED EMBODIMENT

Figure 1:
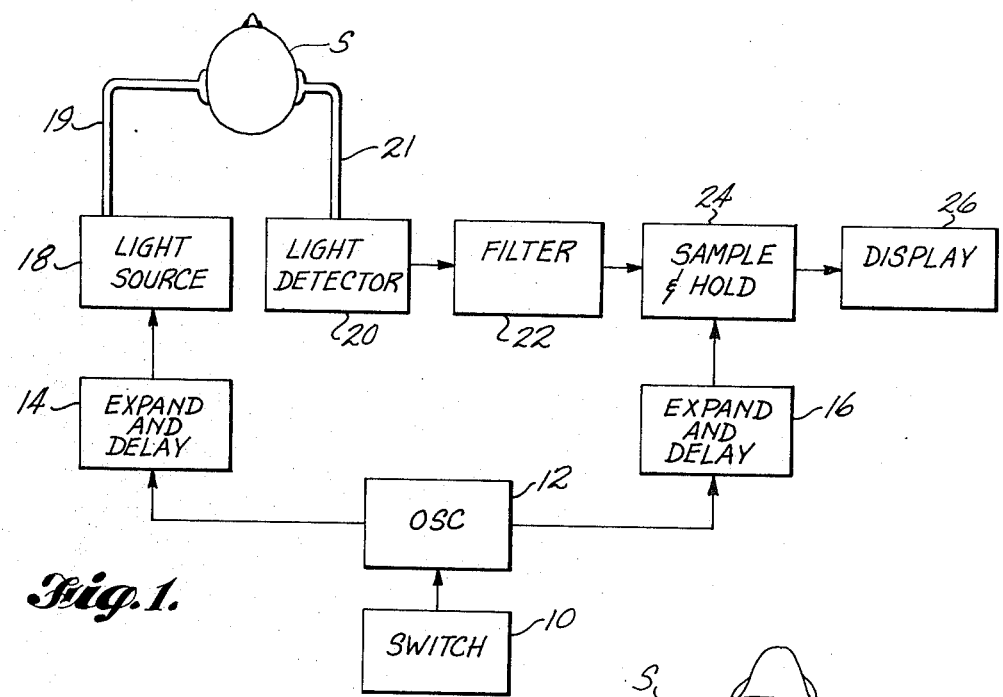
FIG. 1 is a block diagram of a preferred embodiment of the transilluminator.

To fully understand the problems involved in obtaining a quantitative reading of transillumination which is useful in medical diagnosis, a brief sketch of the anatomy of a human head must be given.

The human brain is supported within the cranial cavity of the skull by a membraneous structure which cushions the brain from undue agitation and damage and which additionally surrounds the connection of the brain to the spinal cord. More particularly, the brain is enveloped by three membranes. The most immediate membrane surrounding the brain is called the pia mater. Surrounding the pia mater is a membrane termed the arachnoid, and surrounding the arachnoid membrane is a third membrane called the dura mater. Each of these membranes normally define passages for a fluid substance.

The brain itself includes a number of cavities which communicate between themselves and which are additionally continuous with the central canal of the spinal cord. These cavities are known as the ventricles. The right and left lateral ventricles extend from the front of the cranial cavity to the rear thereof. The third ventricle is situated between the right and left lateral ventricles and extends in a parallel direction, connecting at one end to the fourth ventricle whose greatest extent lies perpendicular to the aforementioned ventricles. As each of these ventricles communicate with each other and with the spinal cord, they are continuously filled with fluid and, under normal conditions, are of a certain size and shape.

The skull itself comprises a plurality of bones which, in the adult human, are interlocked to form a rigid structure. The front bones, or those which form the forehead, are known as frontals. First and second parietal bones are disposed in the rear of the frontals and form the side and roof of the skull. Finally, the rear of the skull is closed by the occipitals.

In the immature or fetal skull, an opening exists between the frontals and the parietals. This opening is known as the frontal fontanel and is covered by a separate membrane until, in the older child, the frontals fuse with the parietals.

The front of the skull is known as the anterior, and the rear thereof as the posterior. The distance between the two most distant and opposite points of the parietal bones is known as the bi-parietal distance. The region immediately below the arachnoid membrane, or that which lies between the dura mater and the pia mater, is known as the subarachnoid region. Likewise, the region below the dura mater is known as the subdural region.

It is known that hydrocephalus normally occurs in the following places: the subarachnoid and the subdural regions, the right and left lateral ventricles, and the third and fourth ventricles. As these places are normally fluid-filled, it is the abnormal increase in fluid therein that accompanies the onset of hydrocephalus. Previously, an observer using the technique of clinical transillumination has been able to diagnose, in time for correction, hydrocephalus in the subarachnoid and subdural areas, and then only after the onset of the disease. Generally, it heretofore has not been possible to detect hydrocephalus in the right and left lateral ventricles or third and fourth ventricles in time for correction.

The present invention has the sensitivity to detect hydrocephalus at its very onset in the subarachnoid and subdural regions and in the right and left lateral ventricles, and in addition to determine the width of any hydrocephalic enlargement. Most important, the present invention provides a quantitative measurement of the transilluminated body portion. This quantitative measurement is in units of optical density and can be correlated with previous transilluminator measurements of the same and other body portions, and with X-rays and other studies of the body portion.

Now referring to FIG. 1, a switch 10 controls the operation of a main oscillator 12. In turn, the oscillator 12 supplies a series of triggering pulses at a relatively low frequency, on the order of 120 Hz, to both an expand and delay circuit 14 and an expand and delay circuit 16. The output pulses from circuit 14 control the operation of a light source 18 whose light output is coupled to the body portion to be transilluminated, such as the skull S in FIG. 1, by a light-conducting means 19.

The transilluminated light pulse is received by a similar light-conducting means 21 and conducted thereby to a light detector 20. Light detector 20 provides an output pulse whose magnitude is proportional to the intensity of light received thereby. This output pulse is coupled through an ambient-eliminating filter circuit 22 to the input of a sample and hold circuit 24. The control input of sample and hold circuit 24 is supplied from the output pulse of expand and delay circuit 16. Accordingly, circuit 24 operates to measure the height of the pulse provided by filter circuit 22 and to provide a DC voltage whose magnitude is proportional to the pulse height. The DC voltage is coupled to a display means 26 which provides a visual indication in units of optical density.

In more detail, the oscillator 12 may include any common, stable audio oscillator. It is also desirable that the oscillator 12 include wave shaping circuitry so that the output thereof comprises a series of short DC pulses, such as illustrated in FIG. 5a.

The pulses supplied to circuits 14 and 16 are identical in timing and magnitude. In turn, each of the circuits 14 and 16 operates thereon to increase the pulse width and to delay the leading edge of the pulses by a predetermined amount. The criteria for selection of circuits 14 and 16 require that the output pulse from expand and delay circuit 14 occur earlier and have a greater pulse width than that from circuit 16. Representative output pulses of these types are seen in FIGS. 5b and 5c, respectively.

Light source 18 may comprise a conventional strobe or flashlamp which provides a high-intensity output light pulse in response to the pulse from expand and delay circuit 14. If light source 18 comprises such a lamp, it is desirable that light-conducting means 19 comprise a fiber optic light pipe having a relatively flared end for effective illumination of the body portion.

In an alternate embodiment, light source 18 and light-conducting means 19 may comprise a light-emitting semiconductor device, such as a gallium arsenide, GaAs, diode.

Once the light pulse has entered the body portion, the light is diffused throughout the interior thereof. If the light-conducting means 21 is placed at a point separated from the point at which light-conducting means 19 is placed, a portion of the light pulse introduced into the body portion is received and conducted to the light detector 20. Under normal conditions, the body portion is relatively opaque to light transmission and thus very little light is conducted to detector 20. Under abnormal conditions, involving an increase in the amount of fluid within the body portion, good light conducting paths are available through the fluid from the point of light pulse entry to the point of detection, and therefore the amount of the light pulse supplied to detector 20 increases.

In one embodiment, the light detector 20 may comprise a photomultiplier tube and accordingly the light-conducting means 21 should comprise a fiber optic light pipe which is similar in construction to the light pipe used for light-conducting means 19. In an alternate embodiment, light detector 20 and light-conducting means 21 may comprise a silicon photo-detecting diode. In either case, the electrical output pulse provided by detector 20 has one component which is proportional to the amount of light transmitted through the body portion. The electrical pulse from detector 20 also includes a component whose magnitude is proportional to the level of ambient light within the measurement area. In most cases, this ambient light is due to interior lighting sources operating at a frequency of 60 Hz. The output pulse from detector 20 including the component due to ambient light can be seen in FIG. 5d.

The filter circuit 22 may comprise a simple high pass filter which is designed to have a rolloff which permits passage of the 120 Hz transilluminated light component but which blocks passage of the 60 Hz ambient light component. Accordingly, the output of filter circuit 22 may appear as indicated in FIG. 5e. In another embodiment, the filter circuit 22 may be eliminated and ambient light removed from the output signal from detector 20 by pulsing the sample and hold circuit 24 just before and just after the production of a light pulse by source 18. The output of these two sampling measurements could then be fed into a difference amplifier whereby the output thereof would be truly responsive to the transilluminated light component.

Sample and hold circuit 24 may comprise any of those well known to the art which are designed to sample the magnitude of an input pulse thereto during the period when a signal is supplied to a control electrode thereof, and to thereafter hold that magnitude in the form of a DC voltage until a subsequent control signal is received.

Therefore, the time delay between the production of the triggering pulse by oscillator 12 and the production of the control signal represented by the output pulse from expand and delay circuit 16 is determined by the period of time required for the light source 18 to produce an output pulse in response to its control pulse from expand and delay circuit 14, plus the time for this light pulse to build up in magnitude past the transient stage to a relatively stable, peak stage, plus the response time of detector 20 and filter circuit 22. The duration of the pulse from expand and delay circuit 14 is determined by the period in which it is desired to sample the transilluminated light pulse and the characteristics of sample and hold circuit 24. As can be seen from FIGS. 5d and 5e, a transilluminated pulse has a relatively short, stable peak period which occurs at a certain time after the production of the triggering pulse by oscillator 12.

Figure 5:
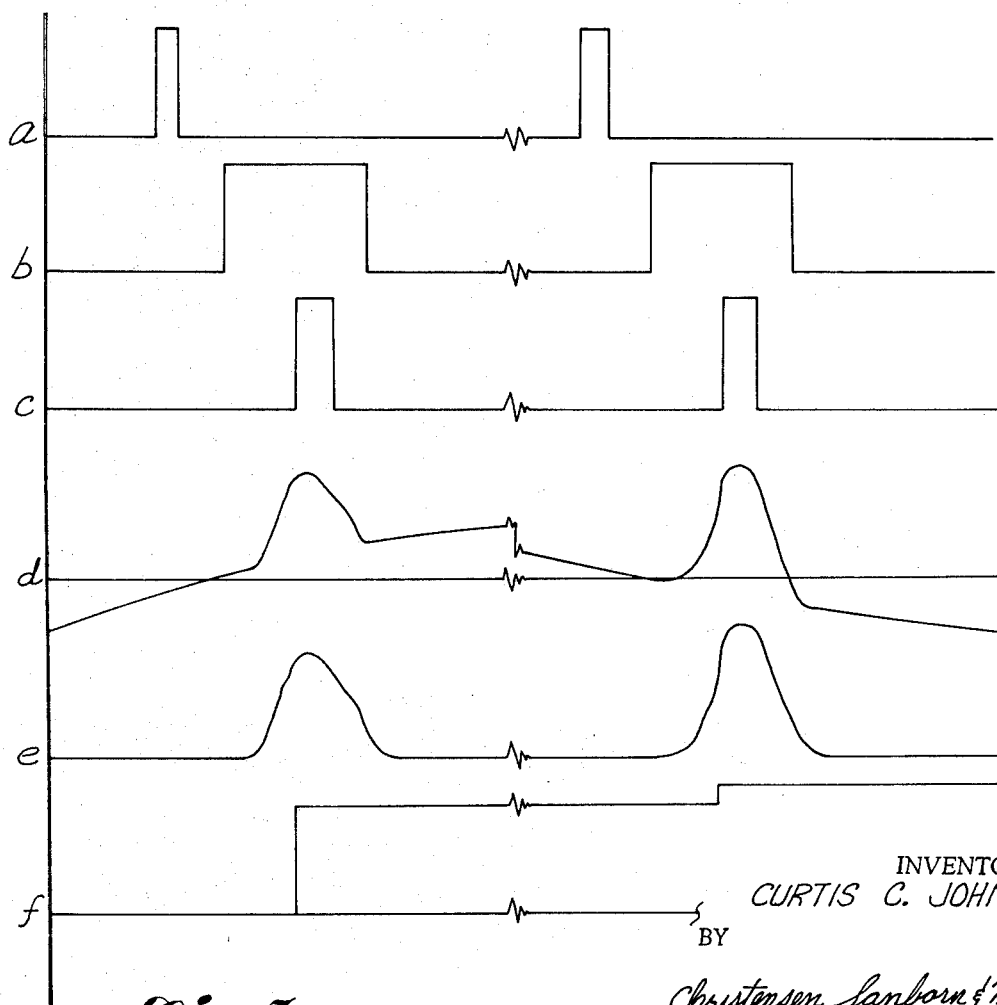
FIG. 5 is a timing diagram illustrating the operation of the transilluminator.

Accordingly, the control pulse from expand and delay circuit 16 shown in FIG. 5c acts to energize sample and hold circuit 24 so that the peak DC value of the transilluminated light pulse is stored and supplied to display means 26. This pulse is shown in FIG. 5f. It can be noted that the second series of pulses illustrated in FIG. 5 result in a transilluminated light pulse having a slightly higher peak magnitude than the first series, and thus the output signal supplied to display means 26 illustrated in FIG. 5f has a slightly higher DC value.

Another embodiment of the invention contemplates that expand and delay circuit 16 and sample and hold circuit 24 be eliminated and replaced by a peak detecting diode arrangement commonly known to the art.

The output signal thus supplied to display means 26 is a DC voltage whose magnitude is directly proportional to the intensity of the transilluminated light pulse. This DC voltage is directly related to the transmittance T of the transilluminated body portion, or, the ratio of the amount of light received at the point of measurement by light-conducting means 21 to the amount of light introduced into the body portion by light-conducting means 19. The transmittance T is in turn related to the optical density of the transilluminated body portion, wherein optical density is defined as:

$$OD = \log 1/T$$

Accordingly, display means 26 can be calibrated with a logarithmic scale in terms of units of optical density, hereinafter referred to as $OD$ units.

The value indicated on display means 26 is a quantitative measurement of the optical density in $OD$ units. In one embodiment, the display means 26 may comprise a simple DC volt meter having its scale appropriately calibrated. The units of calibration may be conveniently obtained by placing filters of known optical density between the light-conducting means 19 and 21 and appropriately marking the scale of display means 26.

Methods of using the apparatus of FIG. 1 can best be illustrated by reference to the pictorial diagrams in FIGS. 2 and 3. In both of these figures, the apparatus is shown for use in detecting hydrocephalic conditions in the human skull. Accordingly, a skull S is illustrated which supports the brain within the cranial cavity thereof. As best illustrated in FIG. 3, the brain is covered by a membraneous structure M including the dura mater, arachnoid membrane, and pia mater. The interior of the brain within these membranes includes the right and left lateral ventricles 30, 31, respectively, the third ventricle 32, the fourth ventricle 34, the foramen 33 which connects the right and left lateral ventricles 30, 31 with the third ventricle 32, and the aqueduct of Sylvius 35 which connects the third ventricle with the fourth ventricle.

To measure the amount of subarachnoid and subdural fluid within the membraneous structure M best illustrated in FIG. 3, it is desirable that the light-conducting means 19 and 21 be maintained a fixed distance apart on the exterior of the skull. In the clinical transillumination procedure previously described, this type of fixed distance measurement was the only one possible. In that procedure, the observer would start at the frontal fontanel by shining the light of the flashlight thereinto and inspecting the immediate adjacent regions of the skull for evidence of light transmission. Thereafter, the observer would move the flashlight from the fontanel over the remainder of the skull and inspect at points immediately adjacent to its periphery for evidences of light transmission.

With the apparatus of this invention, the light-conducting means 19 and 21 can be separated by greater fixed distances than that of the clinical transillumination procedure. In this situation, the light-conducting means 19 and 21 would be placed in the positions illustrative at the top of the skull in FIG. 3. Besides being more sensitive, the apparatus also gives a quantitative measurement so that the fluid can be continuously monitored, whether or not it is in an abnormal state.

The increased sensitivity of this apparatus also makes possible two other types of measurements heretofore unreliable. The first of these is known as the anterior-posterior measurement and is illustrated by the relatively horizontal position of the light-conducting means 19 and 21 in FIG. 3. In this case, the light-conducting means 19 having the light pulse thereon is placed at the frontal fontanel and the light-conducting means 21 is shifted slightly at the rear of the skull to determine the amount of fluid in the right and left lateral ventricles by determining the optical density thereof. Since the anterior-posterior dimension is rather large, this measurement was heretofore not successfully obtained with the clinical transillumination procedure.

Figure 2:
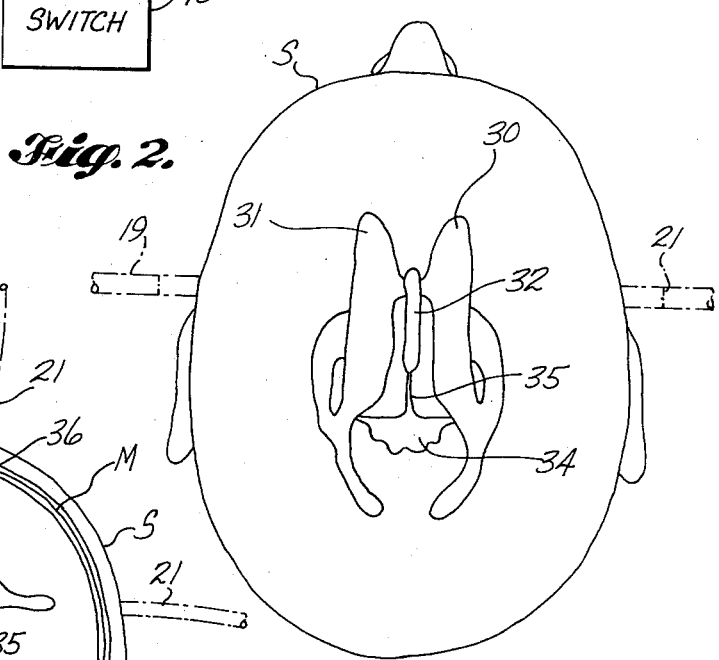
FIGS. 2 and 3 are pictorial diagrams of some of the internal anatomy of the skull involved in hydrocephalic conditions and the placement of the light-conducting means required to diagnosis such conditions.
Figure 3:
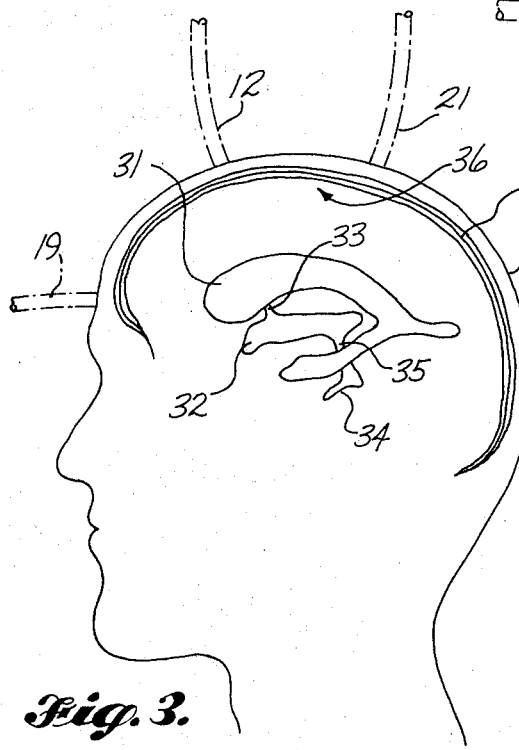

The second of these is known as the bi-parietal and is illustrated by the ear-to-ear position of the light-conducting means 19 and 21 shown in FIG. 2. In this case, the light-conducting means 19 is placed adjacent one of the parietals and the light-conducting means 21 adjacent the other, and the optical density of any light transmitting fluid paths therebetween is measured. In particular, this measurement allows determination of the extent of enlargement of the right and left lateral ventricles in width, and could be used to determine the presence of fluid within either of the third or fourth ventricles. Again, because of the distance and high optical density of the light transmission paths in the bi-parietal measurement, this technique has heretofore not been successfully used.

Figure 4:
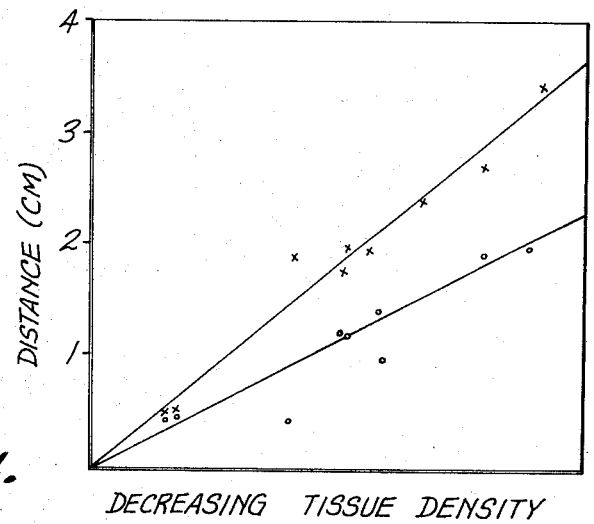
FIG. 4 is a graph illustrating the relative sensitivities of clinical transillumination and transillumination using the apparatus of this invention.

The results of a calibration experiment involving a comparison of the clinical transillumination procedure and a method using the apparatus of this invention is seen in the graph of FIG. 4. Measurements were taken using the fixed-distance technique. It was assumed that an observer using the clinical transillumination procedure could measure optical densities approximately equal to 4 $OD$ units. An examination was carried out on several subjects, and the results are plotted in FIG. 4 according to decreasing tissue density. The abscissa of the plot indicates the distance between the flashlight and apparent transillumination in the clinical procedure, or the distance between the light-conducting means 19 and 21 obtained with the transilluminator required to measure an optical density of about 4 $OD$ units. The straight line nature of both plots shows that the readings obtained from the quantitative pulsed transilluminator can be correlated with the readings obtained from the clinical transillumination procedure. In addition, it can be noted that the quantitative pulsed transilluminator consistently determined optical densities of 4 $OD$ units over greater distances than the clinical transillumination procedure. This result would indicate that the latter procedure could not provide a sensitivity of 4 $OD$ units and that the actual sensitivity was somewhat less.

In another experiment, clinical data were taken by the bi-parietal and anterior-posterior measuring techniques for a plurality of subjects. The results for four of these subjects are shown in the following table.

TABLE

| Subject | A | B | C | D |
| --- | --- | --- | --- | --- |
| Bi-parietal Dist. (cm) | 8 | 12 | 8 | 8 |
| Bi-parietal O.D. | 6.2 | 4.8 | 6.5 | 5.5 |
| O.D./cm | .77 | .32 | .81 | .61 |
| Ant.-Post. Dist. (cm) | 10.5 | 20 | 10.5 | 13 |
| Ant.-Post. O.D. | 5.7 | 5.4 | 6.6 | 6.5 |
| O.D./cm | .54 | .27 | .62 | .50 |

Subjects A, B and D were hydrocephalic infants, and subject C was a normal infant. It will be noted that the results are tabulated both in terms of $OD$ units and in $OD$ units per centimeter. From this and other data, it has been ascertained that the existence of hydrocephalus can be consistently diagnosed from bi-parietal optical densities per centimeter less than 0.8 or anterior-posterior optical densities per centimeter less than 0.6.

Because of its ability to provide quantitative information regarding the interior of a body portion, the apparatus of this invention has several other important applications. In one of these, measurements of the same body portion may be taken using both X-rays and the quantitative pulsed transilluminator. When enough information is obtained about specific configurations within the body portion, such as the physical size of the fluid cavities, and a correlation obtained between the quantitative measurement of OD units with the physical measurements taken by X-rays, subsequent measurements can be made by using the quantitative pulsed transilluminator only. Such a procedure would be carried out in a manner similar to that in which the output of the apparatus has been calibrated against measurements of hydrocephalus obtained from the clinical transillumination procedure. The advantage of this correlation would be to eliminate the use of possibly harmful X-rays in sensitive areas of the body or in cases where a large number of repeated measurements have to be taken over a relatively short period of time.

A second application is in determining the nature of the particular fluid within the body portion. In such cases, the light source 18 is modified to be relatively monochromatic, that is, to provide a light pulse having a fairly narrow band of wavelengths. For example, the use of a red light emitting source or a red filter can be used to monitor the presence of blood within the fluid. A similar example would be the use of infrared light for greater penetration than is possible with typical white light. Another example would be the measurement of optical transmission spectroscopy, either by collectively using a plurality of different frequency light emitters, or by modifying the light detector to be frequency sensitive, as with the commonly-known monochromator.

In any case, it is to be clearly understood by those skilled in the art that this invention has a scope beyond that illustrated in the preferred embodiment of FIG. 1 and is useful in any applications in which a quantitative measurement of transillumination through a body portion is desired. Therefore, it should be noted that the limits of the invention are to be bounded only by the scope of the appended claims.

I claim:

1. An apparatus for measuring the optical density of a human or an animal body portion, comprising:
   a. means providing a high-intensity light pulse,
   b. means for conducting said light pulse to a first point on the body portion,
   c. detecting means providing a first signal whose magnitude is proportional to the light detected at a second point on the body portion,
   d. means sampling said first signal to remove ambient and noise components therefrom and providing a second signal whose magnitude is proportional to the amount $T$ of said light pulse which is transmitted between said first and second points, and
   e. means converting said second signal into an output whose magnitude $OD$ is proportional to said optical density and which is related to the amount $T$ represented by said second signal by a relation $OD = \log 1/T$.

2. An apparatus as recited in claim 1 wherein said light pulse providing means comprises a flashlamp, and said conducting means comprises a fiber optic light pipe.

3. An apparatus as recited in claim 1 wherein said detecting means comprises a fiber optic light pipe and a photomultiplier tube, said light pipe conducting the light present at said second point to said photomultiplier tube.

4. An apparatus as recited in claim 1 wherein said light pulse providing means and said conducting means comprise a semiconductor light-emitting device, and said detecting means comprises a semiconductor photo-detecting device.

5. An apparatus as recited in claim 1, wherein said converting means further includes a display means which provides a corresponding visual indication of said output in units of optical density.

6. An apparatus as recited in claim 1, further including:
   a. an oscillator providing a series of pulses having a relatively low repetition rate, and
   b. means controlling the operation of said light pulse providing means in response to said pulses.

7. An apparatus as recited in claim 1, wherein said sampling means includes a high pass filter removing ambient light components from said first signal.

8. An apparatus as recited in claim 1,
   a. further including
      i. an oscillator providing a series of pulses having a relatively low repetition rate, and
      ii. a first expand and delay circuit controlling the operation of said light pulse providing means in response to said pulses from said oscillator,
   b. wherein said sampling means further includes
      i. a sample and hold circuit having input, output, and control terminals, and operative to store and hold on said output terminal the DC value of any signal present at said input terminal whenever a control signal is applied to said control terminal,
      ii. a second expand and delay circuit coupling said pulses from said oscillator to said control terminal, and
      iii. means coupling said first signal to said input terminal of said sample and hold circuit so that said second signal appears on said output terminal thereof in response to the pulses from said second expand and delay circuit.

9. An apparatus as recited in claim 8 wherein said light pulse providing means comprises a flashlamp which is connected to said first expand and delay circuit and said conducting means comprises a fiber optic light pipe.

10. An apparatus as recited in claim 8 wherein said detecting means comprises a fiber optic light pipe and a photomultiplier tube, said light pipe conducting the light present at said second point to said photomultiplier tube and said photomultiplier tube providing in response thereto said first signal.

11. An apparatus as recited in claim 8 wherein said light pulse providing means and said conducting means comprises a semiconductor, light-emitting device which is connected to said first expand and delay circuit, and said detecting means comprises a semiconductor photo-detecting device providing said first signal.

12. An apparatus as recited in claim 8, wherein said converting means further includes a display means which provides a corresponding visual indication of said output in units of optical density.

13. An apparatus as recited in claim 8, wherein said coupling means of said sampling means includes a high pass filter removing ambient light components from said first signal.

14. A method for detecting the onset of hydrocephalus and other conditions involving an increase of fluid within a human or an animal body portion and a corresponding decrease in optical density thereof, comprising the steps of:
   a. providing a high-intensity light pulse at a first point on the body portion,
   b. detecting all the light present at a second, separated point on the body portion,
   c. removing ambient and noise components from the detected light and providing a signal therefrom which is related to the amount of said light pulse that is transmitted through said body portion from said first point to said second point, and
   d. converting said signal into units of optical density $OD$ by using a relation $OD = \log 1/T$, where $T$ is proportional to the magnitude of said signal.

15. A method as recited in claim 14 wherein said light pulses are continuously provided at a repetition rate of 120 Hz.

16. A method as recited in claim 14 which is particularly adapted to measurements of the optical density of the membraneous structure of a human skull, further including the step of
   e. always maintaining said first and second points separated on said skull by a fixed, predetermined distance.

17. A method as recited in claim 14 which is adapted to longitudinal measurements of the optical density of a human skull having an interior and a posterior, wherein step (a) includes providing said light pulse at the anterior thereof and step (b) includes detecting said light at the posterior thereof.

18. A method as recited in claim 14 which is particularly adapted to bi-parietal measurements of the optical density of a human skull having a pair of parietals, wherein step (a) includes providing said light pulse at one of the parietals thereof, and step (b) includes detecting said light at the other parietal thereof.

* * * * *

PO-1050
(5/69)

UNITED STATES PATENT OFFICE
CERTIFICATE OF CORRECTION

Patent No. 3,674,008          Dated July 4, 1972

Inventor(s) Curtis C. Johnson

It is certified that error appears in the above-identified patent and that said Letters Patent are hereby corrected as shown below:

Claim 17, line 70, correct "interior" to "anterior".

Signed and sealed this 31st day of October 1972.

(SEAL)
Attest:

EDWARD M. FLETCHER, JR.          ROBERT GOTTSCHALK
Attesting Officer          Commissioner of Patents